US008662585B2

(12) United States Patent
Garvis et al.

(10) Patent No.: US 8,662,585 B2
(45) Date of Patent: Mar. 4, 2014

(54) MOTION SEAT

(75) Inventors: Andrew W. Garvis, Sorrento, FL (US);
Dennis P. Wilhelm, Orlando, FL (US);
Richard E. Johnson, Debary, FL (US);
Steven G. Lansrud, Groveland, FL (US)

(73) Assignee: Industrial Smoke & Mirrors, Inc., Orlando, FL (US)

( * ) Notice: Subject to any disclaimer, the term of this patent is extended or adjusted under 35 U.S.C. 154(b) by 267 days.

(21) Appl. No.: 13/173,620

(22) Filed: Jun. 30, 2011

(65) Prior Publication Data

US 2013/0001995 A1    Jan. 3, 2013

(51) Int. Cl.
*B60N 2/02* (2006.01)
*B60N 2/50* (2006.01)

(52) U.S. Cl.
USPC .. 297/314; 297/325; 297/344.15; 297/344.17

(58) Field of Classification Search
USPC .......................... 297/314, 344.15, 344.17, 325
See application file for complete search history.

(56) References Cited

U.S. PATENT DOCUMENTS

| 348,633 | A | * | 9/1886 | McFarland | 297/313 X |
|---|---|---|---|---|---|
| 1,093,042 | A | * | 4/1914 | Etherington | 297/314 X |
| 1,281,921 | A | * | 10/1918 | Ethering | 297/314 X |
| 1,398,935 | A | * | 11/1921 | Miller | 297/314 X |
| 1,429,979 | A | * | 9/1922 | Spanenberg | 297/314 X |
| 2,707,986 | A | * | 5/1955 | Johnson | 297/314 X |
| 3,134,568 | A | * | 5/1964 | Carson | 248/425 |
| 4,183,492 | A | * | 1/1980 | Meiller | 297/314 X |
| 5,795,022 | A | * | 8/1998 | Brown | 297/314 |
| 5,901,612 | A | * | 5/1999 | Letovsky | 297/314 X |
| 6,688,689 | B1 | * | 2/2004 | Thorn | 297/314 |
| 7,044,553 | B2 | * | 5/2006 | Ropp | 297/344.15 |
| 7,063,386 | B2 | * | 6/2006 | Dowty et al. | 297/314 X |
| 7,083,234 | B2 | * | 8/2006 | Dowty et al. | 297/314 |
| 7,281,749 | B2 | * | 10/2007 | Yamada et al. | 297/314 X |
| 7,303,234 | B2 | * | 12/2007 | Dowty et al. | 297/314 |
| 7,338,126 | B2 | * | 3/2008 | Ropp | 297/344.15 |
| 7,506,910 | B2 | * | 3/2009 | Leitner et al. | 296/68 |
| 7,520,469 | B2 | * | 4/2009 | Baumann | 297/314 X |
| 7,637,570 | B2 | * | 12/2009 | Becker et al. | 297/314 |
| 7,871,116 | B2 | * | 1/2011 | Leitner et al. | 297/344.17 X |
| 7,922,247 | B2 | * | 4/2011 | Dickie | 297/314 X |
| 2002/0135214 | A1 | * | 9/2002 | Ursel et al. | 297/325 X |
| 2005/0173952 | A1 | * | 8/2005 | Van Der Laan | 297/314 X |
| 2009/0261641 | A1 | * | 10/2009 | Dickie | 297/314 |

* cited by examiner

*Primary Examiner* — Rodney B White
(74) *Attorney, Agent, or Firm* — GrayRobinson, PA

(57) ABSTRACT

A motion seat for use in a vehicle motion simulator comprises a seat back, a seat pan, a first actuator coupled to a linkage assembly located on one side of the seat pan, a second actuator coupled to an identical linkage assembly on the other side of the seat pan, and a third actuator coupled to a linkage assembly on the aft end of the seat pan, wherein the first and second actuators are effective to independently produce roll right and roll left motion of the seat pan while collectively creating upward and downward heave motion of the seat pan and the third actuator is effective to create surge motion of the seat pan.

20 Claims, 15 Drawing Sheets

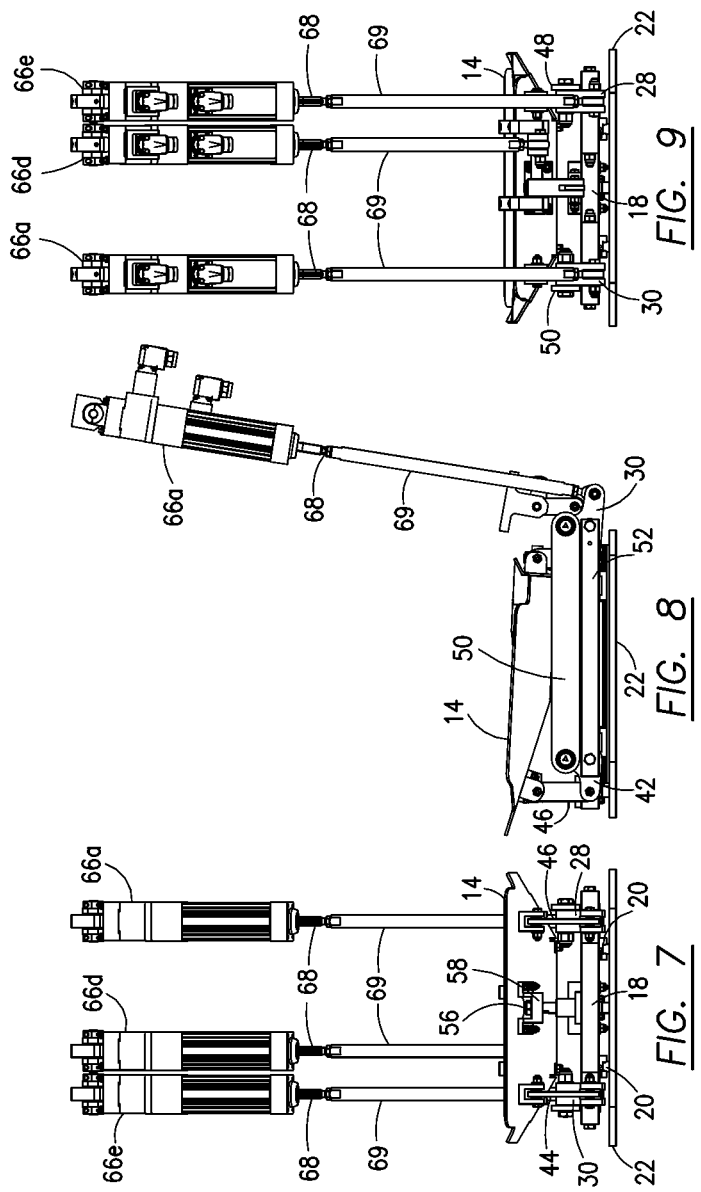

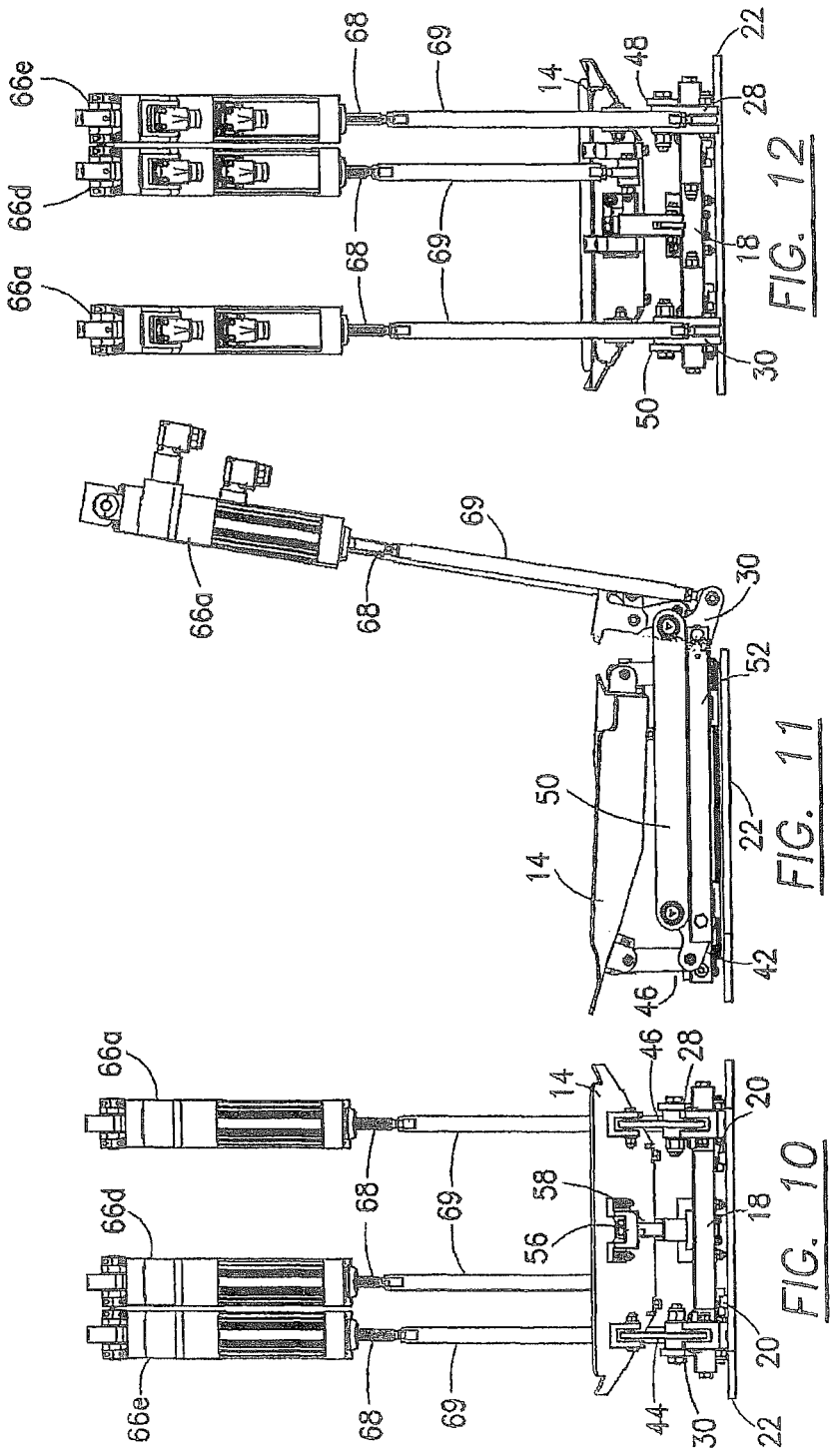

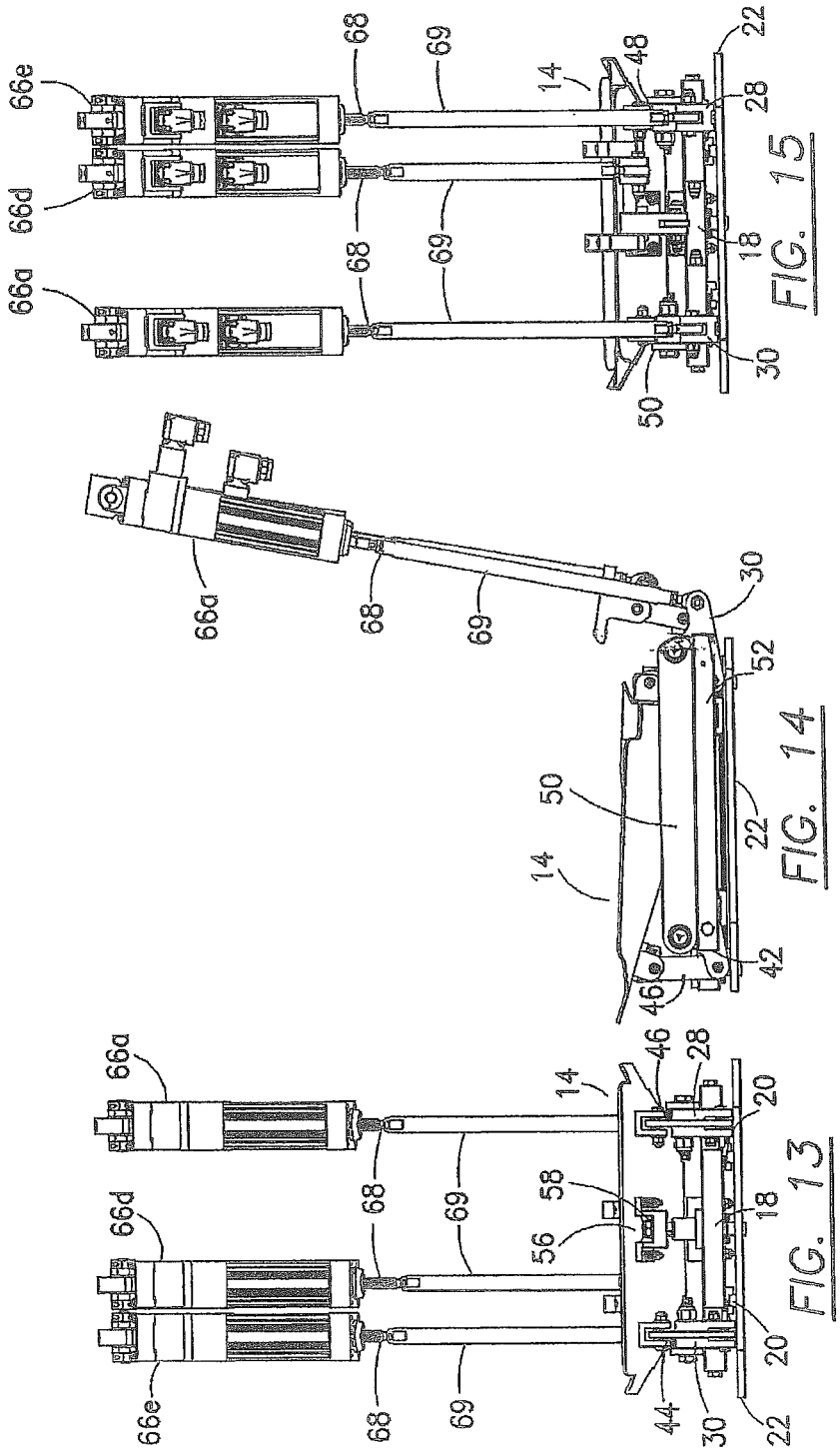

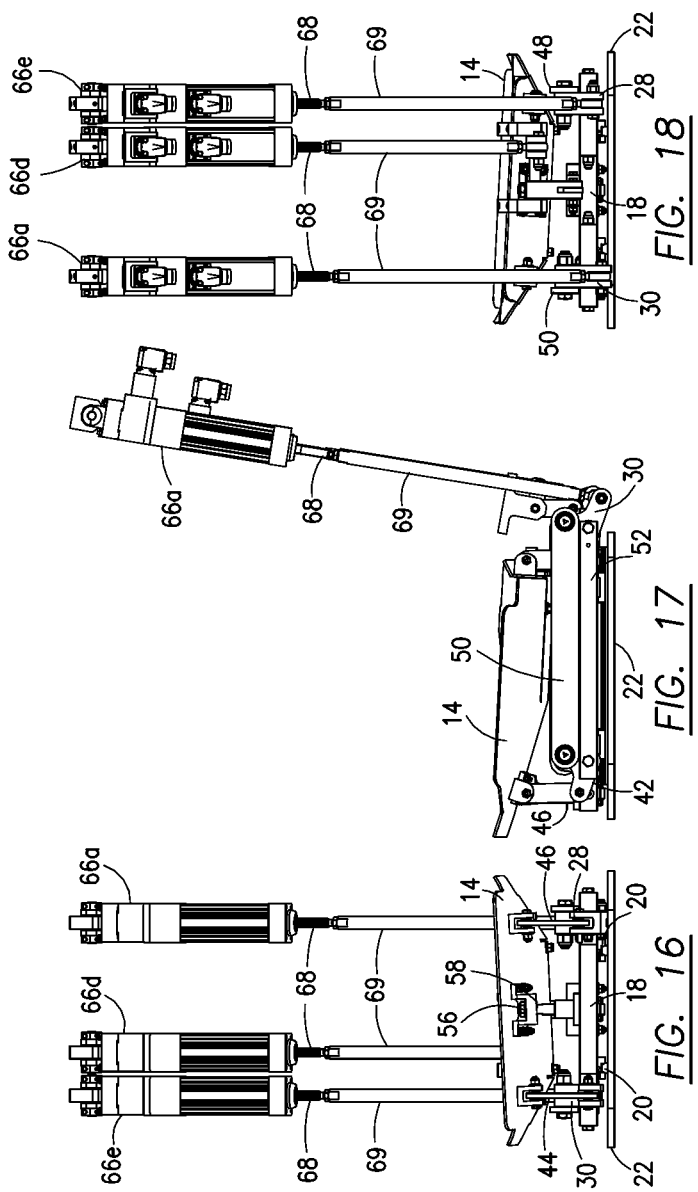

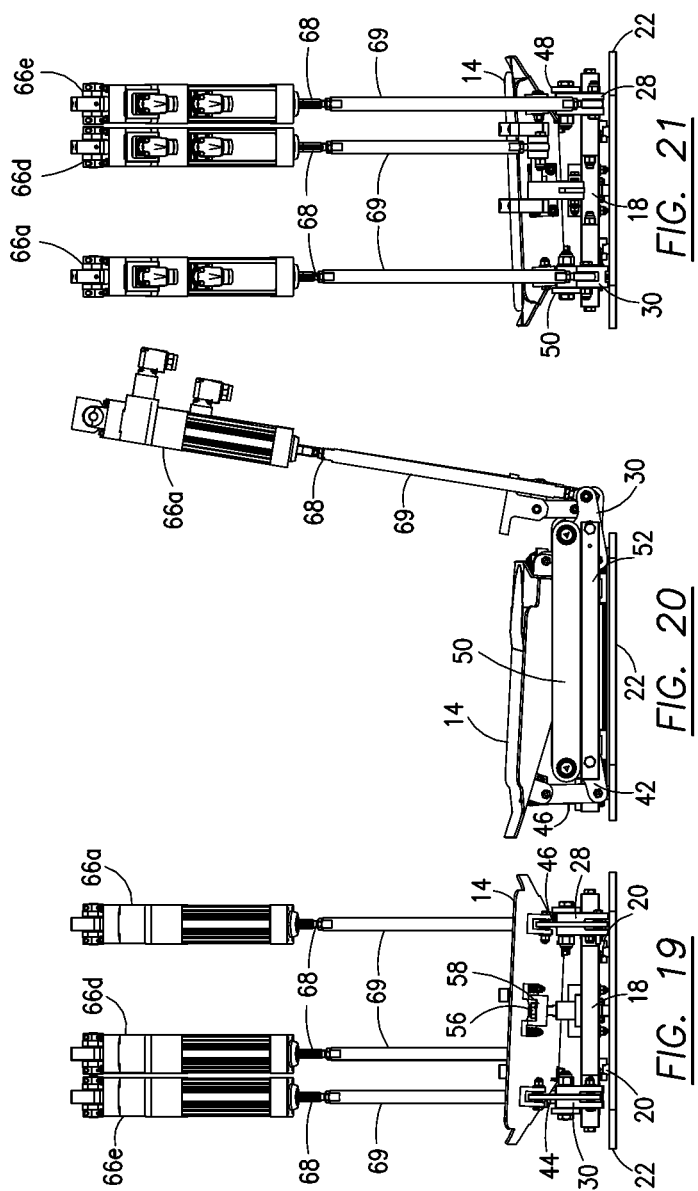

MOTION SEAT

FIELD OF THE INVENTION

This invention relates to motion simulators for aircraft, land vehicles and water vehicles, and, more particularly, to a motion seat which provides impulse, onset and sustained motion cuing to an individual operating the simulator.

BACKGROUND OF THE INVENTION

Flight simulators are one of the most common motion simulation systems in use today and are capable of re-creating aircraft flight and different aspects of the flight environment. Flight simulators are employed for flight training, the design and development of aircraft, control handling evaluation and other purposes. Depending on the purpose of a particular system, flight simulators can range in complexity from PC-laptop models to full flight simulators employing replicas of an aircraft cockpit including controls, aircraft systems and wide-field outside-world (OTW) visual systems all mounted on six degree-of-freedom motion platforms which move in response to control commands from the cockpit and external aerodynamic forces. These motions include three linear movements, namely heave (up and down), surge (fore and aft) and sway (side-to-side), and, three rotational movements including pitch (rotation about the sway axis), yaw (rotation about the heave axis) and roll (rotation about the surge axis).

In addition to motion platforms, flight simulators may include one or more motion seats intended to replicate the pilot and co-pilot seats of a particular aircraft. Motion seats comprise a seat pan and a seat back which collectively are capable of providing surge, sway, heave and roll movements, independently of but in coordination with, the motion platform on which the motion seats are mounted. In most current motion seat designs, the seat pan undergoes heave and roll motions while surge and sway movements are produced by the seat back. Typically, one actuator is required, on both the left-hand and right-hand sides of the seat pan, to effectuate a heave motion, and another actuator on each side of the seat pan is operative to produce roll left or roll right motion, as the case may be. This construction is cumbersome, expensive, relatively complex and inefficient. Additionally, the seat pan of currently available motion seats has no capability to move in a fore and aft direction to complement the surge motion provided by the seat back.

SUMMARY OF THE INVENTION

This invention is directed to motion seats particularly intended for use in aircraft motion simulation systems, but also may be used for land vehicle and water vehicle motion simulation systems, in which impulse, onset and/or sustained motion cuing are provided by one or more motion seats each capable of producing surge, sway, heave and roll motions.

In one presently preferred embodiment, the motion seat of this invention comprises a frame which mounts a seat pan and a seat back. A first actuator is coupled to a first linkage assembly located on one side of the seat pan, and a second actuator is coupled to a second linkage assembly on the other side of the seat pan. Each of the first and second actuators is effective to produce heave motion and roll motion of the seat pan, operating either together or independently of one another. The first and second actuators extend and retract simultaneously to produce heave motion of the seat pan, and roll motion may be achieved by extending and retracting the first and second actuators alternately.

A third actuator may be provided to effect fore-and-aft or surge motion of the seat pan. The third actuator is coupled to the seat pan of the motion seat which is mounted atop a carrier plate connected by linear bearings to a base plate secured to the seat frame. A bell crank assembly and bracket connect the third actuator to the carrier plate to produce forward and aft motion of the seat pan in response to extension and retraction of the shaft of the actuator.

The motion seat of this invention reduces cost and complexity compared to prior devices, and enhances overall capability by introducing an additional motion (fore and aft) which is not present in currently available motion seat systems.

DESCRIPTION OF THE DRAWINGS

The structure, operation and advantages of this invention will become further apparent upon consideration of the following drawings taken in conjunction with the accompanying drawings, wherein:

FIG. 7 is a front view of the seat pan and three actuators showing the seat pan in a neutral position;

FIG. 8 is a left side view of FIG. 7;

FIG. 9 is a rear view of FIG. 7;

FIG. 10 is a front view of the seat pan and three actuators illustrating the seat pan in an up position;

FIG. 11 is a left side view of FIG. 10;

FIG. 12 is a rear view of FIG. 10;

FIG. 13 is a front view of the seat pan and three actuators illustrating the seat pan in a down position;

FIG. 14 is a left side view of FIG. 13;

FIG. 15 is a rear view of FIG. 13;

FIG. 16 is a front view of the seat pan and three actuators illustrating the seat pan in an roll left position;

FIG. 17 is a left side view of FIG. 16;

FIG. 18 is a rear view of FIG. 16;

FIG. 19 is a front view of the seat pan and three actuators illustrating the seat pan in an roll right position;

FIG. 20 is a left side view of FIG. 19;

FIG. 21 is a rear view of FIG. 19;

DETAILED DESCRIPTION OF THE INVENTION

Referring initially to FIGS. 1 through 6, a motion seat 10 according to this invention is illustrated. The motion seat 10 is adapted for use as part of motion simulation system (not shown) for a particular type of air, sea or land vehicle. The motion seat 10 includes a seat back, 12, a seat pan 14 and a frame 16 collectively configured to replicate that of a pilot's seat, for example, or a seat in another type of vehicle. As diagrammatically illustrated in FIG. 1, the motion seat 10 of this invention includes structure for creating surge and sway motion of the seat back, as well as heave, roll and fore-aft or surge movement of the seat pan 14. This invention is particularly directed to movement of the seat pan 14, and other structural aspects of the motion seat 10 form no part of this invention and are therefore not discussed herein.

For purposes of the present discussion, the terms "forward" or "front" refer to a direction which one seated in the motion seat 10 would face, and "rear" or "aft" designates the opposite direction. The "right" side of the motion seat 10 denotes the right-hand portion thereof as viewed from the rear of the motion seat 10, and the "left" side denotes the opposite side. The term "up" refers to a vertically upward direction with the motion seat 10 in the orientation shown in FIGS. 1 and 2, and "down" is the opposite direction.

Figure 3:
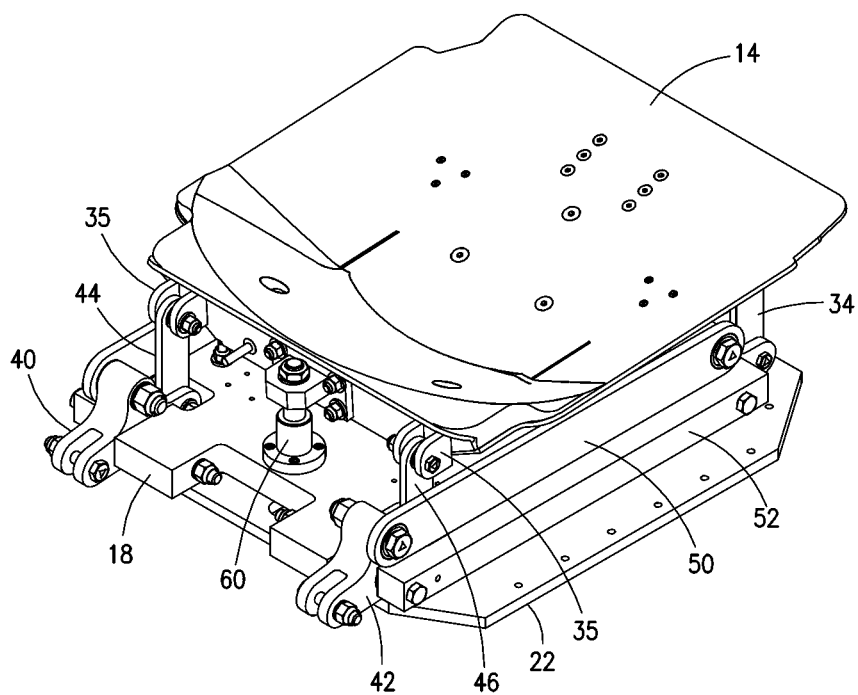
FIG. 3 is a front perspective view of the seat pan portion of the motion seat depicted in FIGS. 1 and 2.
Figure 4:
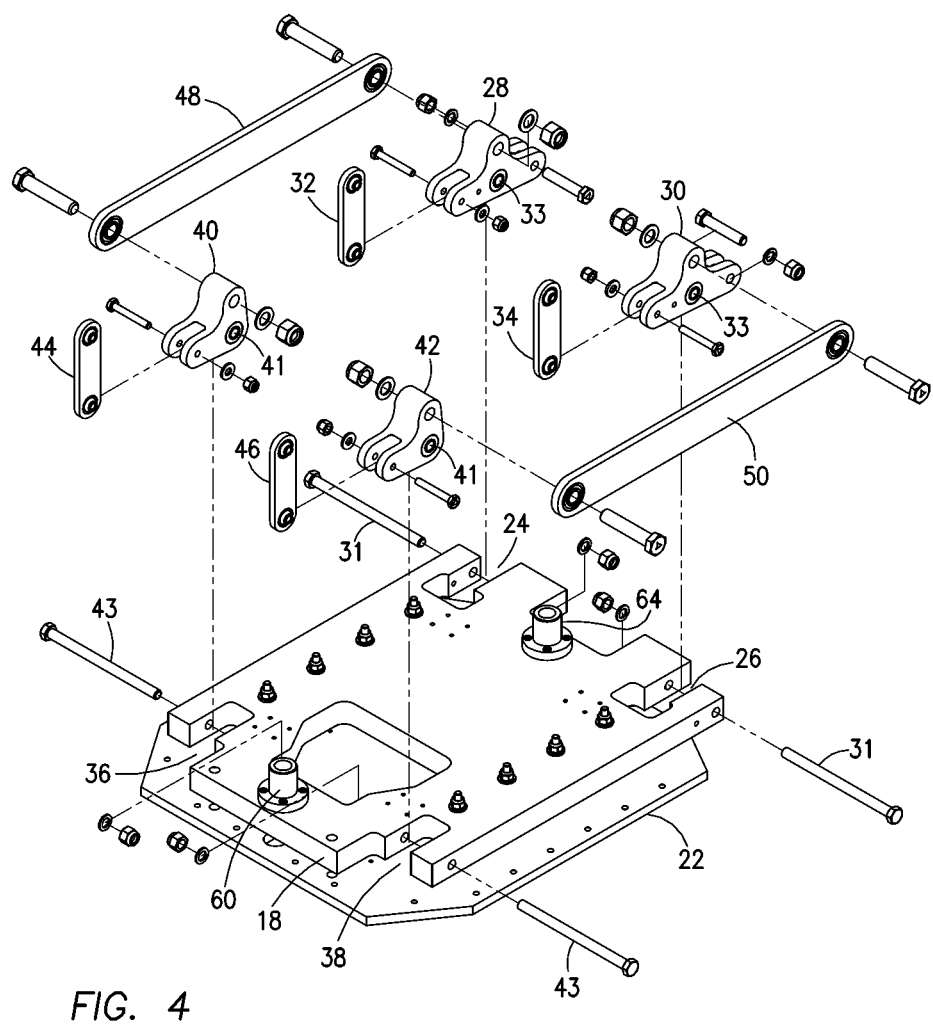
FIG. 4 is an exploded, perspective view of the linkage assembly for the seat pan of the motion seat herein, with the seat pan removed.
Figure 5:
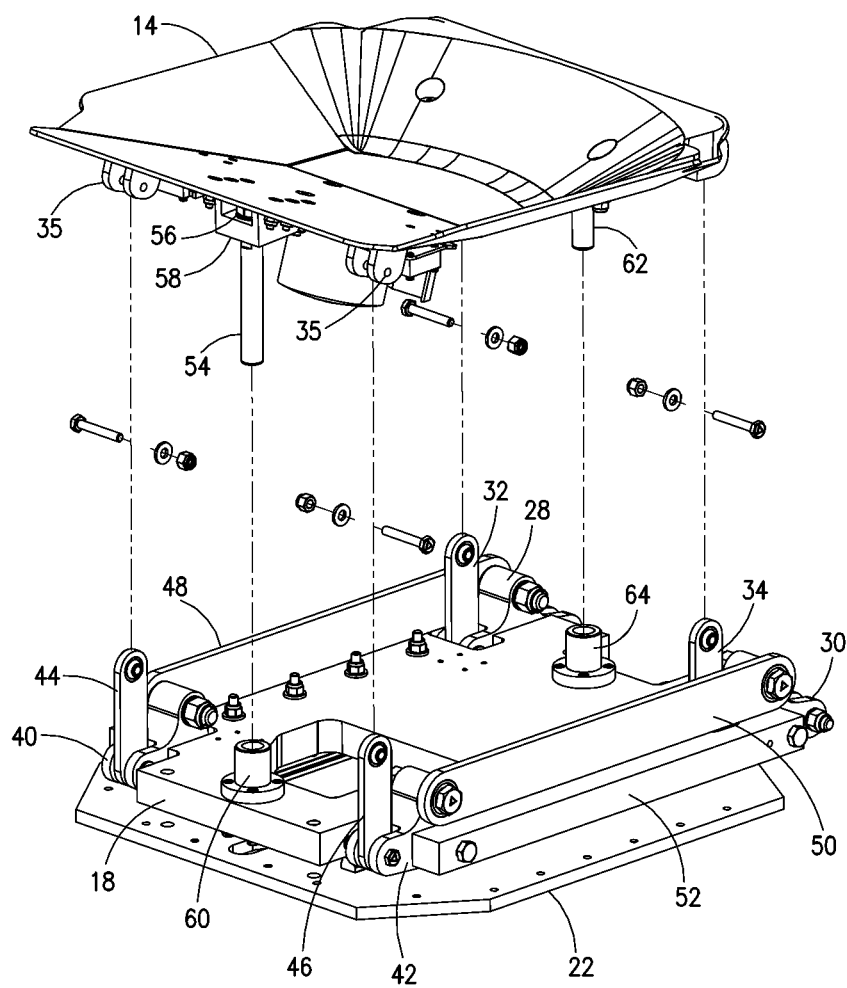
FIG. 5 is a view similar to FIG. 4, except with the components of the linkage assembly in the assembled condition and the seat pan illustrated.

As best seen in FIGS. 3-5, the seat pan 14 is mounted to a carrier plate 18, which, in turn, is supported by linear bearings 20 atop a base plate 22 that mounts to the seat frame 16. See also FIG. 7. The aft end of carrier plate 18 is formed with a pair of cut-outs 24, 26, each of which receives an aft bell crank 28 and 30, respectively, that are pivotally mounted to the carrier plate 18 by a pin 31 inserted within a bearing 33 in the aft bell cranks 28, 30. The forward end of bell crank 28 mounts an aft link 32, and the forward end of bell crank 30 mounts an aft link 34, each of which connects to a yoke 35 mounted on the bottom surface of the seat pan 14. The forward end of the carrier plate 18 is formed with cut-outs 36, 38, each of which receives a forward bell crank 40 and 42, respectively. A pin 43 is inserted into a bearing in each of the forward bell cranks 40, 42 so that they are pivotally mounted to the carrier plate 18. In the presently preferred embodiment, forward bell crank 40 mounts a forward link 44 and forward bell crank 42 is connected to a forward link 46, both of which mount to the seat pan 14 via a yoke 35. A right-side connecting link 48 extends between the aft bell crank 28 and forward bell crank 40, and a left-side connecting link 50 is secured between the aft bell crank 30 and the forward bell crank 42. A shim 52 may be provided between the forward and aft bell cranks 40, 28, and/or between the forward and aft bell cranks 42, 30 to add rigidity to the linkage system when it undergoes motion, as described in more detail.

Right and left linkage assemblies are formed by the components described above. Right linkage assembly includes aft bell crank 28, aft link 32, right-side connecting link 48, forward bell crank 40 and forward link 44. Similarly, the left linkage assembly comprises aft bell crank 30, aft link 34, right-side connecting link 50, forward bell crank 42 and forward link 46. As seen in FIGS. 4 and 5, these components are connected to one another by an assortment of bolts, washers and nuts (all unnumbered). As described below in connection with a discussion of FIGS. 7-21, the linkage assemblies cooperate with actuators 66a and 66e to effect movement of the seat pan in the heave and roll directions.

Figure 6:
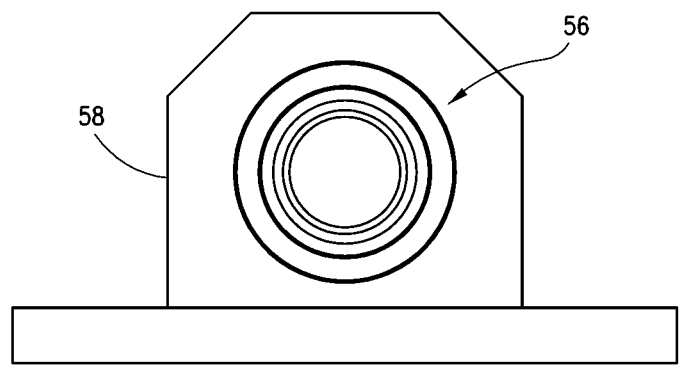
FIG. 6 is a front view of the spherical bearing illustrated in FIG. 5.
Figure 22:
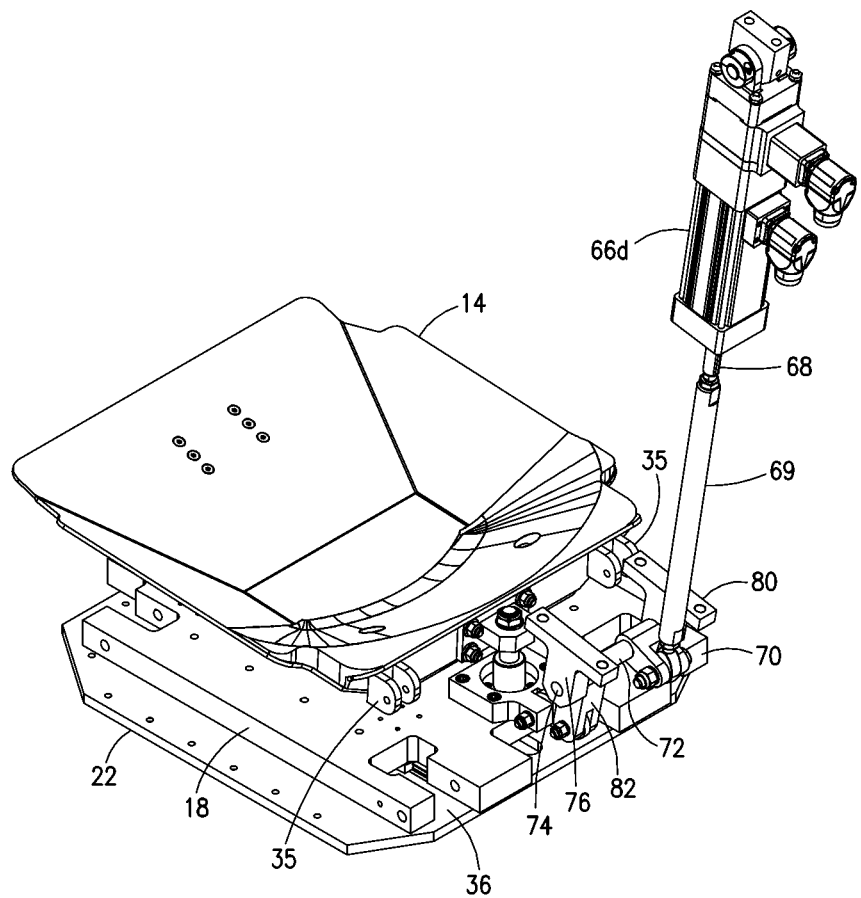
FIG. 22 is a perspective view of the seat pan and a single actuator that governs fore and aft movement of the seat pan.

A front shaft 54 is connected to the seat pan 14 by a spherical bearing 56, shown in FIG. 6, which is held within a pivot block 58. The opposite end of the front shaft 54 is inserted within a forward flange bearing 60 mounted atop the carrier plate 18 at its forward end. Similarly, a rear shaft 62 is mounted to a spherical bearing by a pivot block (not shown), and its opposite end is received within a rear flange bearing 64 secured atop the carrier plate 18 at its aft end.

Figure 1:
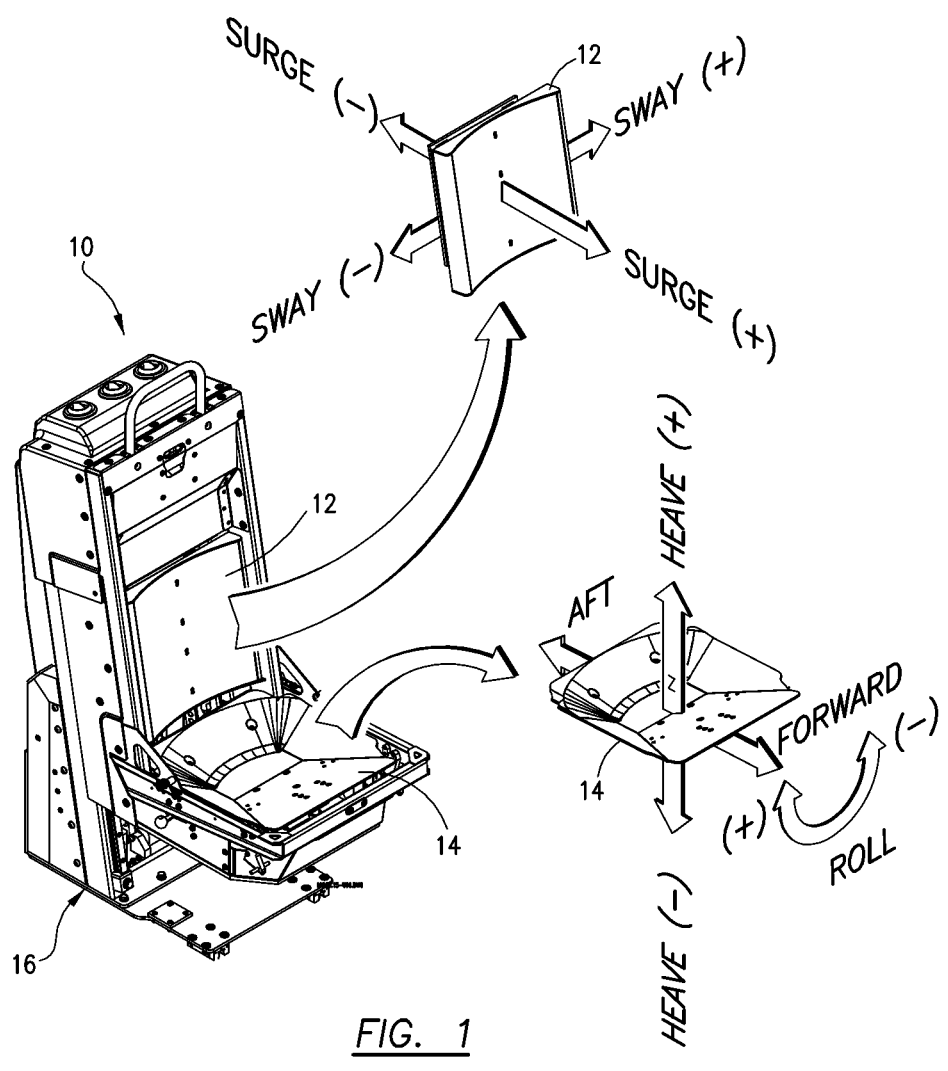
FIG. 1 is a front perspective view of a motion seat according to this invention.
Figure 2:
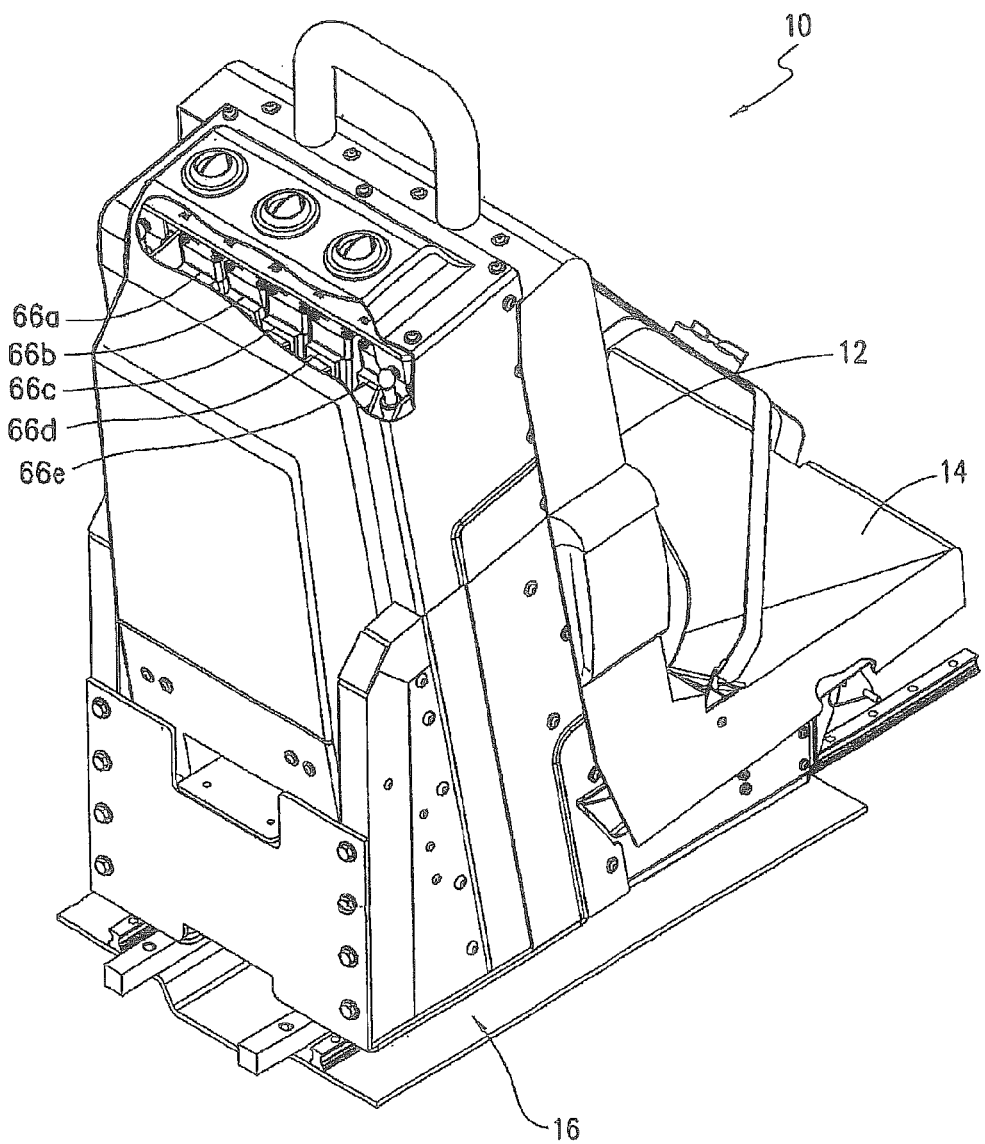
FIG. 2 is a rear perspective view of the motion seat shown in FIG. 1 in which five actuators are partially illustrated.

As shown in FIGS. 2 and 7, for example, a number of actuators 66a-e are mounted side-by side to the frame 16 behind the seat back 12. One currently preferred version of the actuators 66a-e is commercially available from the Exlar Corporation of Chanhassen, Minn. under Model No. GSM20, Part No. GSM20-0301-MCM-IN7-138-60-RB-XT-46044 Actuator. Each actuator 66a-e employs a servo motor coupled to a shaft 68, which, in turn, is coupled by a connecting rod 69 to one of the aft bell cranks 28 or 30. The shafts 68 are movable between an extended and a retracted position causing the aft bell cranks 28, 30 to pivot with respect to the carrier plate 18, as discussed below. As shown with reference to FIGS. 2 and 7, for example, the actuator 66a is connected to the aft bell crank 28 on the left side of seat pan 14, and the actuator 66e is connected to the aft bell crank 30 on the right side of seat pan 14. Actuators 66b and 66c are effective to move the seat back 12 in the surge and sway directions, respectively, but the details of that operation form no part of this invention and therefore are not discussed herein. Additionally, in one preferred embodiment of this invention, the motion seat 10 may be provided with actuator 66d which controls motion of the seat pan 14 in the fore-aft or surge direction, as described in detail below in connection with a discussion of FIGS. 22-25.

As noted above, the motion seat 10 of this invention is capable of movement in the heave, roll, and optionally, the surge (fore and aft) directions, in order to simulate motion of a vehicle in which the operator is seated. One important advantage of this invention is that the motions of heave and roll left are accomplished by actuator 66a, while heave and roll right motions are produced by actuator 66e. In prior motion seat systems, one actuator was required to effect heave motion and a second actuator provided roll movement, on both sides of the seat pan of the system. FIGS. 7-21 illustrate the operation of actuators 66a and 66e which produces heave, right roll and left roll motions of the seat pan 14, as discussed separately below.

Having described the structural components of motion seat 10, its operation in simulating heave and roll movements is described in more detail below in connection with a discussion of FIGS. 7-21. Initially, it should be understood that the motion seat 10 of this invention is capable of providing impulse, onset and/or sustained motion cuing for the operator of a particular motion simulation system, such as a pilot operating a full flight simulator. Impulse cues result from one-time events such as bird strikes, landing gear extension and retraction and landings.

It must be recognized that the shaft 68 of actuators 66a and 66e acting on the linkage assemblies have a limited length of linear travel, e.g. on the order of about 0.5 inches (12.7 mm). Impulse cues, which, in the context of aircraft simulation, result from one-time events such as bird strikes, landing gear extension and retraction and landings. Such impulse cues generally may be replicated by the relatively short linear motion of shaft 68, but a pilot operating the full flight simulator, for example, must be provided with the sensation of greater movement in conducting maneuvers such as take-off, landing, banking and the like. Onset cues are vestibular in nature, and sustained cues are onset cues that are maintained for the duration of a given maneuver. The motion seat 10 of this invention employs the principle of acceleration onset cuing using the movement of the motion seat 10 induced by actuators 66a-e. Acceleration onset cuing replicates movement of an aircraft, for example, in essentially three phases. Initial acceleration of the aircraft resulting from the performance of a particular maneuver is relatively closely replicated by the motion seats 10 acting in coordination with other components of the simulator including the motion platform on which the seats 10 are mounted (not shown). Because the limit of travel of the actuator shafts 68 is quickly reached, after initial acceleration the shaft 68 movement is gradually decreased to zero, e.g. the "washout phase." The motion seat 10 is then reset to a neutral position, but at a rate below the sensory threshold of the pilot. In this way, maneuvers that would produce relatively large movements of the aircraft can be replicated with the actuators 66*a-e* whose shafts 68 have a comparatively small amount of linear travel.

Referring initially to FIGS. 7-9, actuators 66*a* and 66*e*, and seat pan 14, are depicted in the "neutral" position, e.g. midway between the up and down positions, and substantially level from the right side to the left side. The terms "up" and "down" in this context refer to the limits of heave motion of the seat pan 14 between a vertically upward position and a vertically downward position as viewed with the seat pan 14 in the orientation shown in the Figs. Note that in the neutral position the linear bearings 20 support the carrier plate 18, and that the aft bell cranks 28, 30 and forward bell cranks 40, 42 are spaced above the base plate 22.

Movement of the seat pan 14 from the neutral position to the "up" heave position is depicted in FIGS. 10-12. Initially, the shaft 68 of actuator 66*a* and the shaft of actuator 66*e* are moved toward the extended position which drives the linkage assemblies on both sides of the seat pan 14. In particular, the aft bell cranks 28 and 30 are pivoted by the shafts 68 and connecting rods 69 in a clockwise direction which drives the aft links 32 and 34 upwardly, thus lifting both the left-side and right-side of the rear portion of the seat pan 14 in the same direction. The left-side connecting link 50 is pulled in an aft direction in response to pivotal motion of the aft bell crank 30, as viewed in FIG. 11, which, in turn, causes the attached forward bell crank 42 to pivot in a clockwise direction. The forward link 46 is forced upwardly in response to clockwise pivotal motion of the forward bell crank 42 causing the left side of the forward portion of seat pan 14 to move upwardly. Simultaneously, the same motion occurs in the same way on the right side of the seat pan 14 wherein the linkage assembly comprised of the aft bell crank 28, aft link 32, right-side connecting link 48, forward bell crank 40 and forward link 44 lifts the right side of seat pan 14 vertically upwardly. Consequently, the actuators 66*a* and 66*e*, together with their respective linkage assemblies, cooperate to simultaneously create an "up" heave motion of the seat pan 14.

Referring now to FIGS. 13-15, movement of the seat pan 14 to a "down" heave position is shown. Both of the actuators 66*a* and 66*e* work in tandem to move the seat pan 14 downwardly. As best seen in FIG. 14, the shaft 68 of actuator 66*a* and its connecting rod 69 are moved toward the retracted position which pivots the aft bell crank 30 in a counterclockwise direction. As the aft bell crank 30 pivots counterclockwise, the aft link 34 is pulled downwardly and the left-side connecting link 50 is moved in a forward direction. In response to forward movement of the left-side connecting link 50, the forward bell crank 42 is pivoted in a counterclockwise direction thus pulling the forward link 46 downwardly to the same extent as the aft link 34. This same motion occurs in the same manner on the right-side of the seat pan 14 as a consequence of the actuator 66*e* and its connecting rod 69 acting on the right-side linkage assembly, i.e. aft bell crank 28, aft link 32, right-side connecting link 48, forward bell crank 40 and forward link 44. The seat pan 14 is therefore moved in the down heave direction in response to simultaneous retraction of the shaft 68 of actuators 66*a* and 66*e*.

It should be understood that the amount of upward heave motion may be varied, as desired, between the neutral position and the fullest extent that the shaft 68 of actuators 66*a*, 66*e* may be extended. Similarly, the extent of downward heave motion is dependent on to what degree the shafts 68 of actuators 66*a* and 66*e* are retracted. As such, the amount of heave motion can be controlled depending on the requirements of a particular vehicle maneuver to be simulated. Additionally, movement of the seat pan 14 in a heave direction is permitted due to the sliding connection between the front shaft 54 and forward flange bearing 60, and between the rear shaft 62 and aft flange bearing 64. That is, the shafts 54, 62 vertically slide within their respective bearings 60, 64 in response to upward or downward movement of the aft links 32, 34 and forward links 44, 46, as described above.

While the actuators 66*a* and 66*e* cooperate to produce up and down heave motion of the seat pan 14, roll-right and roll-left movement thereof is accomplished by individual operation of the actuators 66*a*, 66*e* and the amount of such movement is determined by what extent the shafts 68 of actuators 66*a* and 66*e* are extended and retracted. Referring initially to FIGS. 16-18, a "roll-left" condition is illustrated wherein the left-side of the seat pan 14, as viewed from its aft end, is lifted vertically upwardly while the right-side of the seat pan 14 remains in a neutral position. The same sequence of operation of actuator 66*a* described above to accomplish an up heave motion is repeated to produce a roll-left condition. The shaft 68 of actuator 66*a* is moved toward the extended position which pivots aft bell crank 30 in a clockwise direction thus forcing aft link 34 upwardly. The left-side connecting link 50 is pulled in an aft direction by clockwise pivotal motion of the aft bell crank 30, which pivots the forward bell crank 42 clockwise forcing the forward link 46 upwardly. The left side of the seat pan 14 therefore tilts upwardly in response to the movement of aft link 34 and forward link 46, and such tilting motion is permitted due to the connection of forward shaft 54 and rear shaft 62 to the spherical bearings 56 mounted on the bottom of the seat pan 14.

FIGS. 19-21 depict a roll-right condition of the seat pan 14 which is accomplished by an up heave motion of the right side of seat pan 14 initiated by the actuator 66*e* while the actuator 66*a* remains in the neutral position. The shaft 68 of actuator 66*e* is moved toward the extended position which pivots aft bell crank 28 in a clockwise direction thus forcing aft link 32 upwardly. The right-side connecting link 48 is pulled in an aft direction by clockwise pivotal motion of the aft bell crank 28, which pivots the forward bell crank 40 clockwise forcing the forward link 44 upwardly. The right side of the seat pan 14 therefore tilts upwardly in response to the movement of aft link 32 and forward link 44, as the forward shaft 54 and rear shaft 62 move within spherical bearings 56.

Referring now to FIGS. 22-25, in which actuators 66*a* and 66*e* are removed for clarity, one presently preferred embodiment of this invention includes additional structure to induce fore-and-aft or surge motion of the seat pan 14. The actuator 66*d* has a shaft 68 secured by a connecting rod 69 to a coupler 70 which is fixed on a rod 72. One end of the rod 72 is carried by the bearing 74 in bearing block 76, and a bearing (not shown) mounted in a bearing block 80 supports the opposite end of rod 72. Both of the bearing blocks 76, 80 are fixed to the seat frame 16. One end of a bell crank 82 is mounted to the rod 72 and its opposite end is connected to a link 84. The link 84, in turn, is connected to a bracket 86 secured atop the carrier plate 18.

Figure 23:
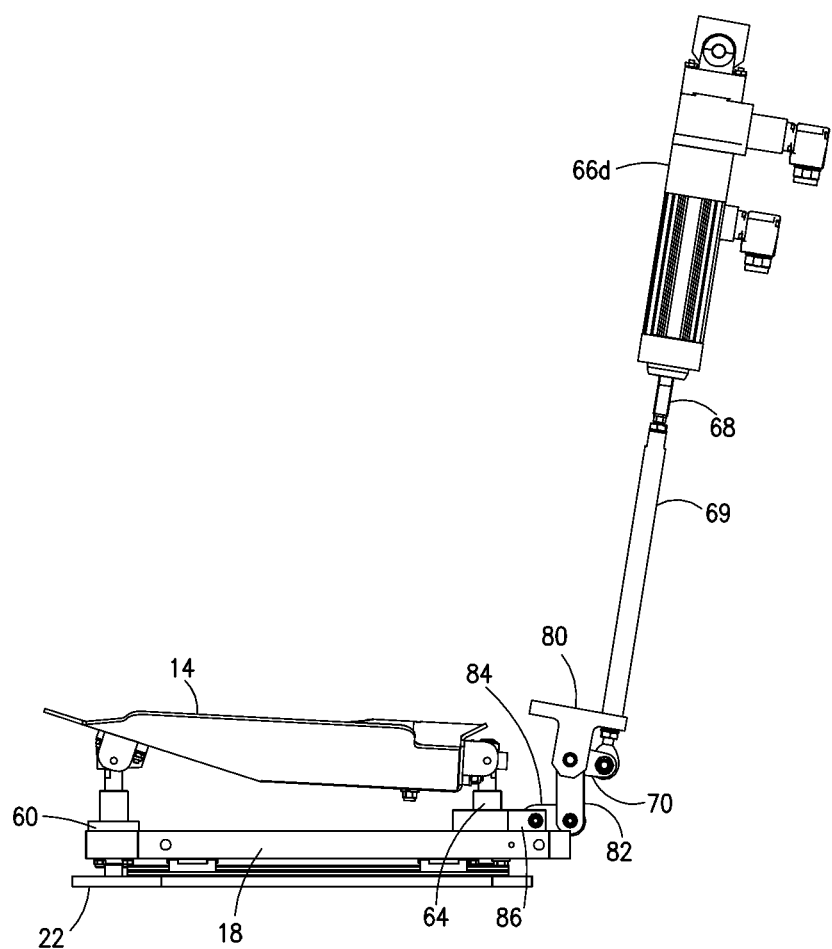
FIG. 23 is a left side view of FIG. 22 with the seat pan in a neutral position.
Figure 24:
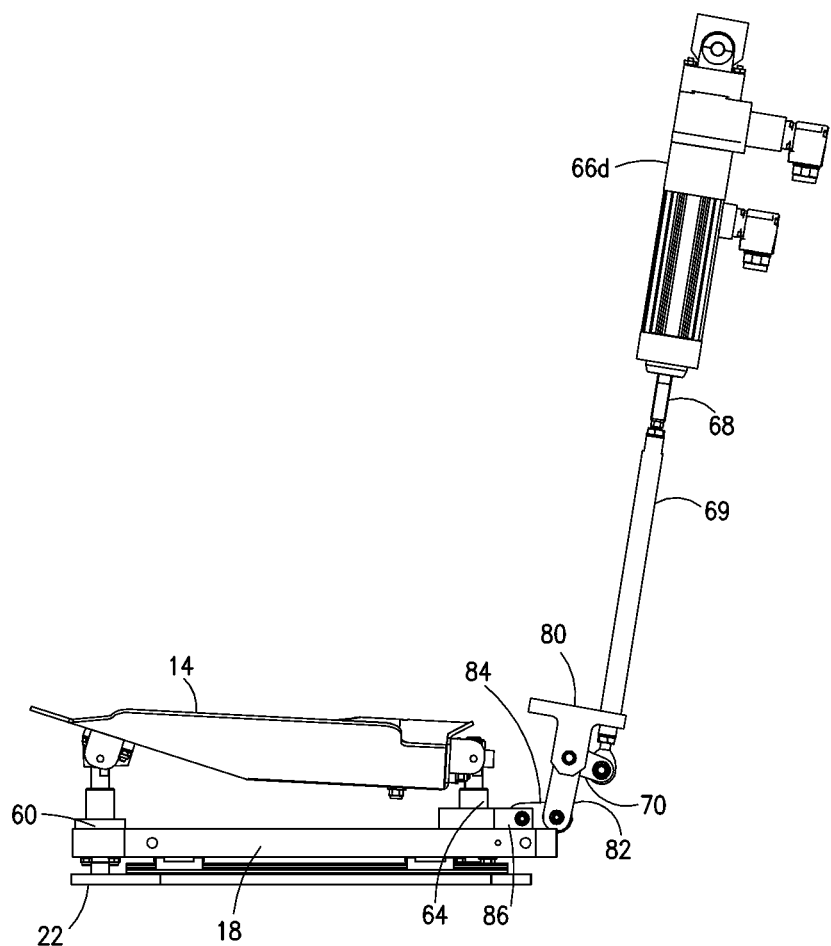
FIG. 24 is a view similar to FIG. 23 except with the seat pan in the forward position.
Figure 25:
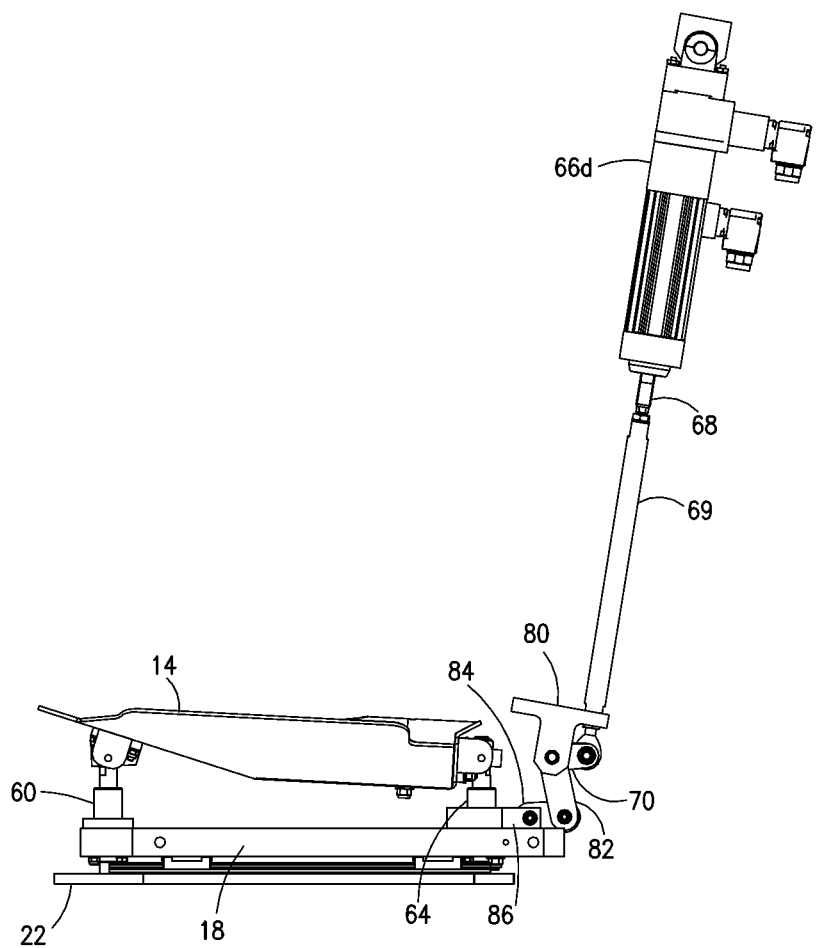
FIG. 25 is a view similar to FIG. 23 except with the seat pan in an aft position.

In response to movement of the shaft 68 of actuator 66*d* toward a retracted position, the bell crank 82 is pivoted from a neutral position shown in FIG. 23 to a forward surge position depicted in FIG. 24. In particular, as the shaft 68 retracts, the rod 72 is pivoted in a clockwise direction causing the bell crank 82 to pivot in the same direction. As the upper end of the bell crank 82 pivots rearwardly, its lower end moves in a forward direction. Due to the connection of bell crank 82 to the carrier plate 18 via the link 84 and bracket 86, the carrier plate 18 and seat pan 14 are also moved in the forward direction. Reverse motion of the carrier plate 18, to an aft or back surge position, is achieved by moving the shaft 68 of the actuator 66d toward the extended position. As seen in FIG. 25, the shaft 72 and bell crank 82 are pivoted in a counterclockwise direction which moves the lower end of bell crank 82 in a rearward direction taking with it the carrier plate 18 and seat pan 14. As noted below, the carrier plate 18 is mounted on linear bearings 20 which allow for motion in the fore and aft directions. The amount of forward and aft surge motion of the seat pan 14 is controlled by the extent the shaft 68 of actuator 66d is extended and retracted.

It should be understood that the actuator 66d may be operated independently of the actuators 66a and 66e so that the fore-and-aft position of the seat pan 14 may be altered regardless of the heave or roll positions of the seat pan 14. For example, FIGS. 10-12 depict the seat pan 14 in an up heave position combined with a surge back condition, i.e. the seat pan 14 has been lifted vertically upwardly by actuators 66a, 66e and moved rearwardly relative to the base plate 22 by actuator 66d in the manner described above. On the other hand, FIGS. 13-15 depict the seat pan 14 in a down, surge forward condition wherein the actuators 66a, 66e have moved the seat pan 14 to a down position while actuator 66d has positioned the seat pan 14 in the forward position.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A motion seat, comprising:
   a back pan;
   a seat pan having a forward end, an aft end and opposed left and right sides;
   a first aft pivot and a second aft pivot each located on one of said opposed left and right sides of said seat pan, each of said first and second aft pivots being connected to said seat pan by an aft link;
   a first forward pivot and a second forward pivot each located on one of said left and right sides of said seat pan, each of said first and second forward pivots being connected to said seat pan by a forward link;
   a first connecting link extending between said first aft pivot and said first forward pivot, and a second connecting link extending between said second aft pivot and said second forward pivot;
   a first actuator coupled to said first aft pivot and a second actuator coupled to said second aft pivot, said first and second actuators each being movable to a first position and to a second position, said first and second actuators when simultaneously moving toward said first position being effective to act on said respective first and second aft pivots in such a way that said seat pan undergoes upward heave motion, said first and second actuators when simultaneously moving toward said second position being effective to act on said respective first and second aft pivots in such a way that said seat pan undergoes downward heave motion.

2. The motion seat of claim 1 in which said simultaneous movement of said first and second actuators toward said second position pivots each of said aft pivots so that respective aft links move said aft end of said seat pan in a downward heave direction, said first and second connecting links pivoting said first and second forward pivots so that respective forward links move said forward end of said seat pan in a downward heave direction.

3. The motion seat of claim 1 in which said simultaneous movement of said first and second actuators toward said first position pivots each of said aft pivots so that respective aft links move said aft end of said seat pan in an upward heave direction, said first and second connecting links pivoting said first and second forward pivots so that respective forward links move said forward end of said seat pan in an upward heave direction.

4. The motion seat of claim 1 in which each of said first and second actuators is movable from a neutral position to said first position, said left roll motion of said seat pan being produced by movement of said first actuator toward said first position while said second actuator remains in said neutral position.

5. The motion seat of claim 4 in which right roll motion of said seat pan is produced by movement of said second actuator toward said first position while said first actuator remains in said neutral position.

6. The motion seat of claim 1 in which each of said first aft pivot, second aft pivot, first forward pivot and second forward pivot is a bell crank.

7. A motion seat, comprising:
   a back pan;
   a seat pan having a forward end, an aft end and opposed left and right sides;
   an aft pivot coupled to said aft end of said seat pan;
   an aft actuator coupled to said aft pivot, said aft actuator being movable to a first position and to a second position, said aft pivot being effective to move said seat pan in a forward direction in response to movement of said aft actuator toward said first position and said aft pivot being effective to move said seat pan in an aft direction in response to movement of said aft actuator toward said second position.

8. The motion seat of claim 7 in which said aft pivot is a bell crank connected at one end to a rod which extends between opposed bearing blocks, the other end of said bell crank being coupled to said seat pan.

9. The motion seat of claim 7 further including a first actuator coupled to said left side of said seat pan, said first actuator being movable from a neutral position to a first position and to a second position, said left side of said seat pan being movable in a roll left direction in response to movement of said first actuator toward said first position while said second actuator remains in said neutral position.

10. The motion seat of claim 9 further including a second actuator coupled to said right side of said seat pan, said second actuator being movable from a neutral position to a first position and to a second position, said right side of said seat pan being movable in a roll right direction in response to movement of said second actuator toward said first position while said first actuator remains in said neutral position.

11. The motion seat of claim 10 in which said first and second actuators are simultaneously movable toward said first position to move said seat pan in an upward heave direction, and said first and second actuators are simultaneously movable toward said second position to move said seat pan in a downward heave direction.

12. A motion seat, comprising:
a back pan;
a seat pan having a forward end, an aft end and opposed left and right sides;
a first aft pivot and a first forward pivot each connected to one of said opposed left and right sides of said seat pan and being connected to one another;
a second aft pivot and a second forward pivot each connected to the other of said opposed left and right sides of said seat pan and being connected to one another;
a first actuator coupled to said first aft pivot and a second actuator coupled to said second aft pivot, said first and second actuators being effective to act on at least one of said respective first and second aft pivots so that said seat pan moves in such a way as to provide acceleration onset cuing to a user positioned in the motion seat in upward heave, downward heave, roll right and roll left directions.

13. The motion seat of claim 12 in which each of said first and second actuators are movable from a neutral position to a first position and to a second position, said downward heave motion of said seat pan being produced by simultaneous movement of said first and second actuators toward said second position.

14. The motion seat of claim 13 in which each of said first and second aft pivots is connected to said seat pan by an aft link and each of said first and second forward pivots is connected to said seat pan by a forward link, said first aft pivot being coupled by a first connecting link to said first forward pivot and said second aft pivot being coupled by a second connecting link to said second forward pivot.

15. The motion seat of claim 14 in which said simultaneous movement of said first and second actuators toward said second position pivots each of said aft pivots so that respective aft links move said aft end of said seat pan in a downward heave direction, said first and second connecting links pivoting said first and second forward pivots so that respective forward links move said forward end of said seat pan in a downward heave direction.

16. The motion seat of claim 14 in which upward heave motion of said seat pan is produced by simultaneous movement of said first and second actuators toward said first position.

17. The motion seat of claim 16 in which said simultaneous movement of said first and second actuators toward said first position pivots each of said aft pivots so that respective aft links move said aft end of said seat pan in an upward heave direction, said first and second connecting links pivoting said first and second forward pivots so that respective forward links move said forward end of said seat pan in an upward heave direction.

18. The motion seat of claim 12 in which each of said first and second actuators is movable from a neutral position to said first position and to a second position, said left roll motion of said seat pan being produced by movement of said first actuator toward said first position while said second actuator remains in said neutral position.

19. The motion seat of claim 18 in which right roll motion of said seat pan is produced by movement of said second actuator toward said first position while said first actuator remains in said neutral position.

20. The motion seat of claim 12 in which each of said first aft pivot, second aft pivot, first forward pivot and second forward pivot is a bell crank.

* * * * *